United States Patent
Roeske

[15] 3,636,973
[45] Jan. 25, 1972

[54] ANALOG POSITION CONTROLLER

[72] Inventor: Eugene A. Roeske, 440 Three Mile Road, Racine, Wis. 53401

[22] Filed: June 1, 1970

[21] Appl. No.: 41,896

[52] U.S. Cl. ....................................................137/488
[51] Int. Cl. ........................................................G05d 16/06
[58] Field of Search ..............................137/488, 492, 492.5

[56] References Cited

UNITED STATES PATENTS

| | | | |
|---|---|---|---|
| 2,698,717 | 1/1955 | Sisco | 137/488 X |
| 3,059,660 | 10/1962 | Dantowitz | 137/488 X |
| 2,731,980 | 1/1956 | Diefenderfer | 137/488 |
| 3,137,210 | 6/1964 | Gavin | 137/488 X |

*Primary Examiner*—Henry T. Klinksiek
*Attorney*—Petherbridge, O'Neill & Lindgren

[57] ABSTRACT

An analog position controller for varying the operative position of a control device such as a valve in response to a pressure signal proportional to a variable parameter being controlled by the control device. The analog position controller includes a control valve assembly slidably mounted to respond to the variable parameter wherein movement of the valve transmits a pressure signal to a pressure-sensitive power means to change the position of the control device. The power means is continuously controlled until a null level is reached by the valve assembly at which time the changing of the operative position of the control device is stopped.

12 Claims, 4 Drawing Figures

INVENTOR.
EUGENE A. ROESKE
BY Petherbridge, O'Neill &
Lindgren
ATTORNEYS.

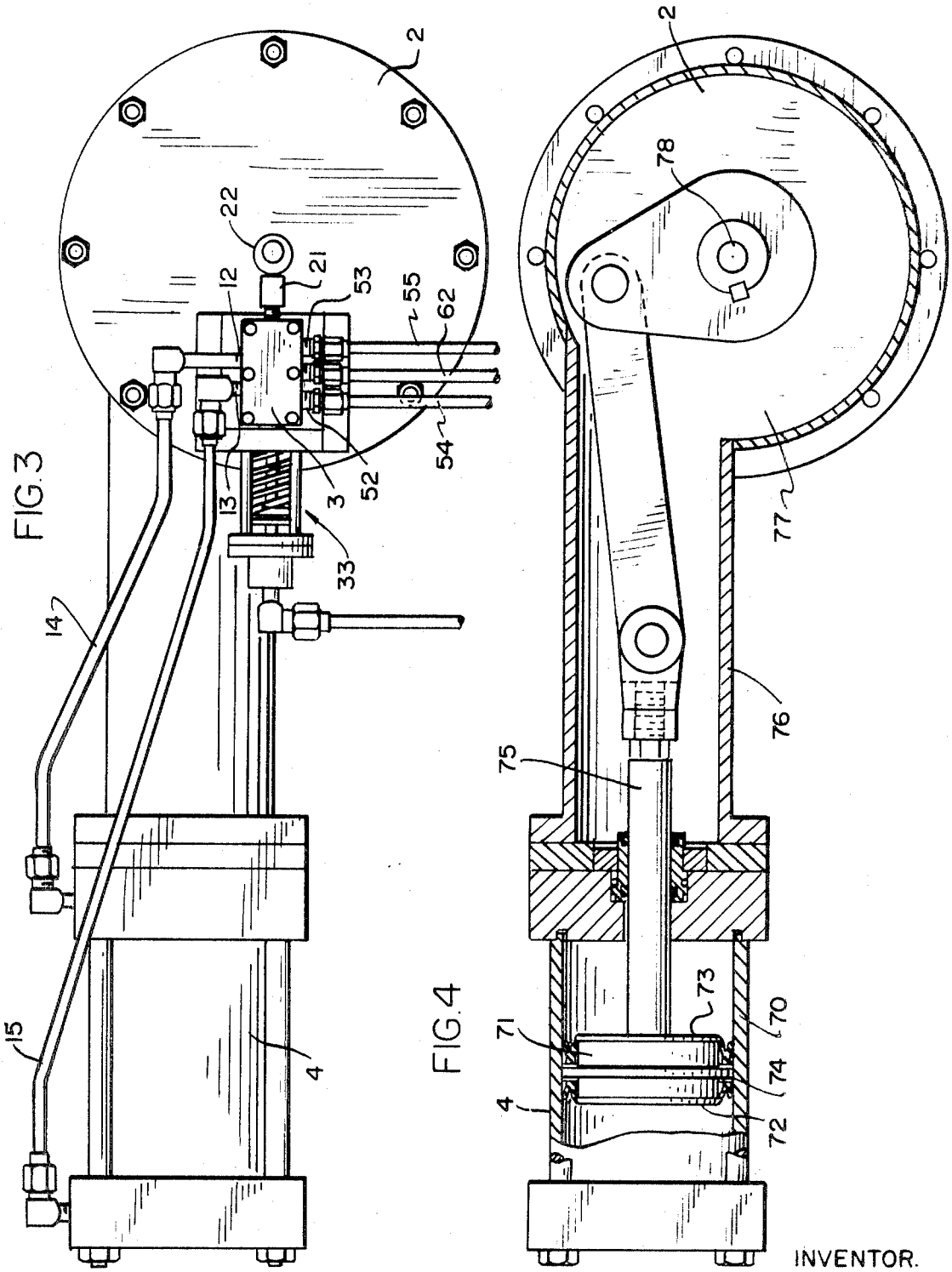

3,636,973

ANALOG POSITION CONTROLLER

BACKGROUND OF THE INVENTION

This invention relates in general to control devices and, in particular, to an analog position controller.

More specifically, the invention relates to an apparatus for controlling the operative position of a control device according to demand or change of a variable condition being controlled. The analog controller herein disclosed responds to the variable condition whereby a pressure signal proportional thereto is transmitted to a valve assembly of the controller which transmits a pressure signal to a pressure-sensitive power means to change the position of the control device. The operative position of the control device is continuously varied until the controller senses a null signal representative of a predetermined level of the variable condition. The apparatus continuously senses the parameter being controlled to increase or decrease the level thereof by adjusting the position of the control device as a direct analog of the input signal.

Conventionally, fluid controllers have been utilized for the purpose of changing the position of a valve or the like according to a variable condition in the fluid passing therethrough such as pressure, temperature, specific gravity and the like. A particular application of such fluid controllers have been in fluid or gaslines for the purpose of controlling a valve for maintaining a desired magnitude of a variable condition in the flow line such as, for example, pressure. In commercial gaslines, the flow in the pipes must be constantly varied according to the utilization of the gas at the delivery locations. Often it is desired to control the pressure across the valve at a constant level, but, as demand in the gasline is increased or decreased, the pressure ratio between the downstream and upstream side of the valve is varied. Therefore, a fluid controller is utilized to change the position of a valve to increase or decrease the flow therethrough in order that a desired pressure difference between the inlet and outlet levels is achieved.

One type of fluid controller heretofore utilized for the control of a valve or other variable control devices did not provide an analog conversion of the pressure signal of the variable condition being sensed for transmission to a power device controlling the control device. Further, most prior art fluid controllers were relatively slow in response to thus be an uneconomical and unreliable control system. Therefore, it is desirable to provide an inexpensive and effective analog position controller to vary the operative position of a control device to maintain a desired parameter of a media in response to a variable condition within the media being maintained.

SUMMARY OF THE INVENTION

It is, therefore, an object of this invention to improve the control of a variable control device according to variable condition.

Another object of the present invention is to control a power device with a fluid controller in a manner proportional to the pressure signal transmitted to the controller.

A further object of this invention is to convert a pressure signal transmitted to a controller apparatus into movement of a pressure-sensitive device in a simplified manner.

Still another object of this invention is to convert a pressure signal into a control signal in an analog relationship.

A still further object of this invention is to improve the apparatus for controlling the operative position of a control device by eliminating venting of fluid therefrom to the atmosphere.

These and other objects are attained in accordance with the present invention wherein there is provided an apparatus for effectively controlling a power device according to a pressure signal input representative of a variable condition. The pressure signal input to the controller is dependent on any variable parameters of a media such as, for example, temperature, pressure, specific gravity and the like. The particular parameter sensed is converted into a pressure signal in a conventional manner which is directed to the novel controller herein disclosed. The pressure signal displaces a valve element of the controller in a manner to conduct a pressure signal to a power device to achieve a desired change of the operative position of a control device varying the condition of the media. The pressure signal from the analog position controller continues to be directed to the power device until the control device varies the condition of the media to a level where the parameter returns to the desired level. The continuous change of the power device while the controller is sensing an increase or a decrease of an input signal is fed back in such a manner that the valve of the invention eventually returns to a null position at which time the control signal transmitted to the power device is balanced to stop movement of the control device.

Thus, it should be apparent that the novel device herein disclosed provides an analog position controller device which continuously senses a variable condition until the condition is rebalanced to a desired level. The controller achieves control of a control device in a manner which is efficient and simple in operation. Further it is conventional in fluid pressurized controllers to exhaust into the atmosphere or into a storage tank. However, in the controller herein disclosed, any exhaust pressure utilized in this system is passed internally thereof and pollution problems of prior art controllers is thereby alleviated. Therefore, the present invention presents a unique analog controller which achieves reliable and accurate results in providing control of a control device in response to variable conditions.

DESCRIPTION OF THE DRAWINGS

Further objects of the invention together with additional features contributing thereto and advantages accruing therefrom will be apparent from the following description of one embodiment of the invention when read in conjunction with the accompanying drawings wherein

FIG. 3 is a top schematic illustration of the analog position controller of the invention;

FIG. 4 is a bottom schematic illustration of the analog controller of the invention having parts removed to better illustrate the invention.

DESCRIPTION OF THE PREFERRED EMBODIMENT

Figure 1:
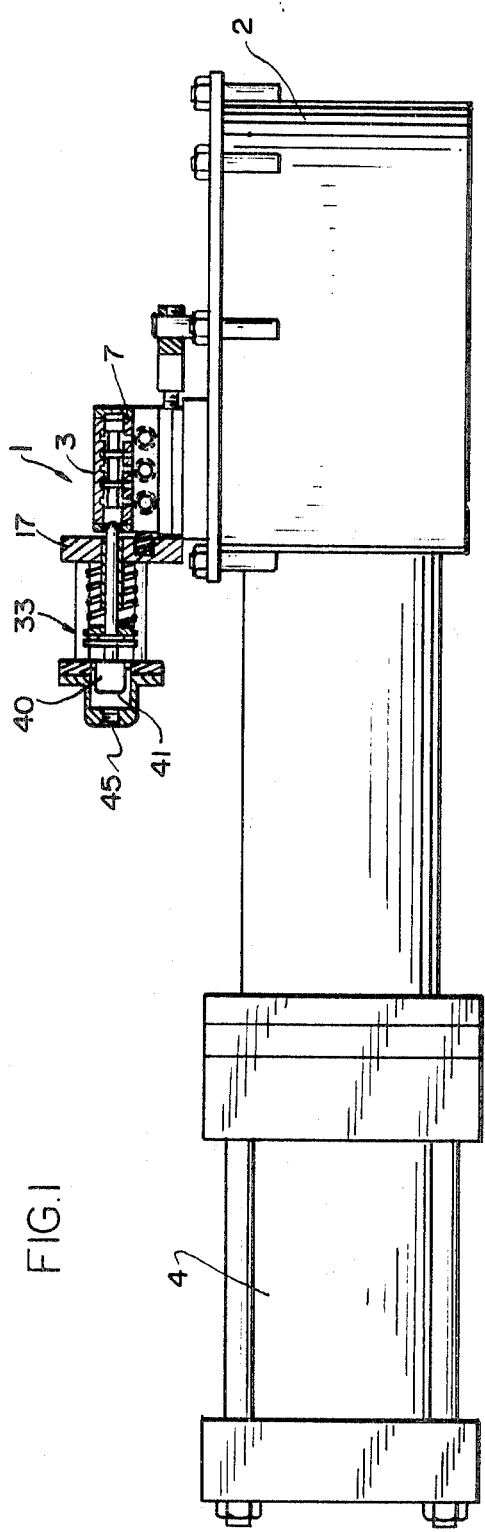
FIG. 1 is a schematic side illustration of the analog position controller of the invention.

Referring now to FIGS. 1 and 3, there is shown schematic views of the analog position controller 1 for use in control of a variable position control device. Although not intended to be so limited, for convenience of illustration the analog position controller 1 is described with reference to the control of the operative position of a valve for regulating the flow of a fluid such as gas through a pipeline or conduit. In FIGS. 1 and 3 a bellcrank housing 2 of a conventional valve (not shown) of any suitable type is adapted to be connected in a known manner in a pipeline or conduit (not shown) and the novel analog position controller 1 of the invention operatively cooperates with the valve to regulate the flow position of the valve. A valving assembly 3 of the analog position controller is suitably mounted on the top of the valve to transmit a pressure signal to a power device 4 (to be described in detail later) which in turn controls the operative position of the valve.

The bellcrank housing 2 described for purpose of illustrating the analog position controller of the invention operatively regulates the control valve which in turn controls the flow of fluid therethrough wherein the upstream pressure being connected to the supply of the fluid is higher than the downstream pressure, as is well known in commercial gaslines. Therefore, the invention may be utilized in conjunction with two sensors (not shown) mounted upstream and downstream of the control valve respectively. Although pressure is the parameter being sensed and described with reference to the embodiment illustrated in FIGS. 1 and 3, it should be apparent that the parameters may be other variables in a gasline such as specific gravity, density, temperature, flow rate, and the like. As the use of the gas in the pipeline or conduit at the utilization or supply station varies, the pressure sensed downstream may be reduced or increased according to the particular condition, and a change in operative position of valve is necessary to vary the pressure ratio in order to maintain a constant pressure downstream in the embodiment shown. The sensors used in conjunction with the analog position controller of the invention may be any conventional sensor which converts a parameter such as pressure or the like to a pressure signal within a conduit in communication with the position controller.

Figure 2:
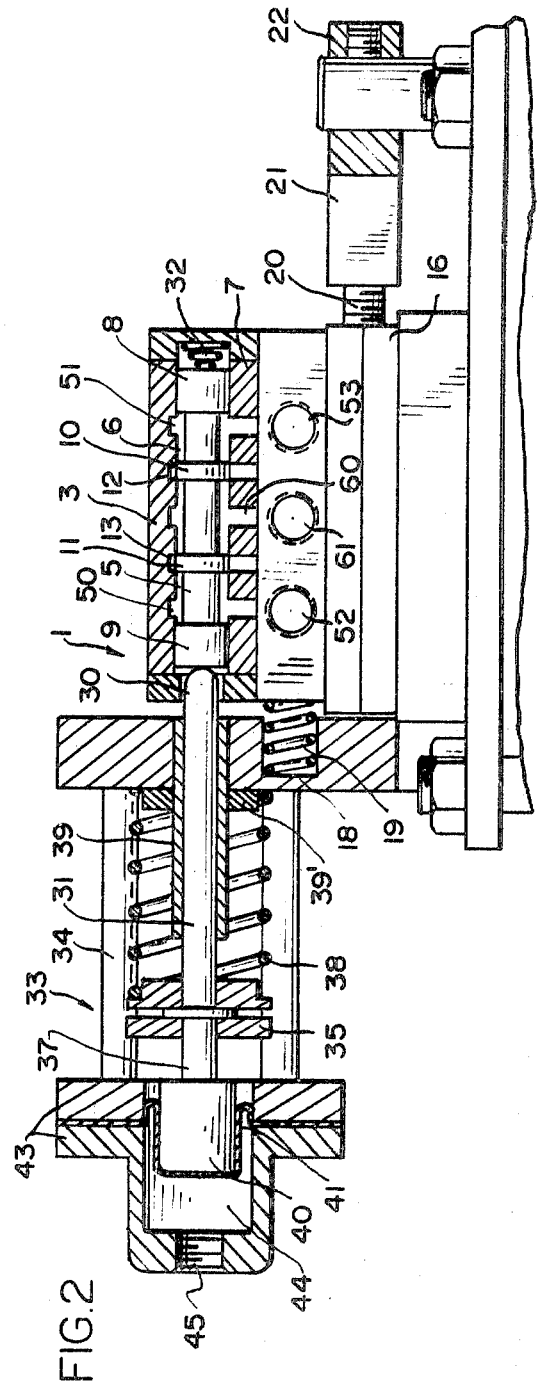
FIG. 2 is an enlarged schematic illustration of the piston and valve assembly shown in the analog position controller of FIG. 1.

The analog position controller 1 includes a valve spool 5 mounted in a central passage 6 of a valve housing 7 to allow the valve spool to slidably move therein as best shown in FIG. 2. The valve spool 5 includes two flanges 8 and 9 on each end thereof having an diameter approximate the same as the passage to be in sealing contact with the passage of the valve housing 7. Further, two inner flange members 10 and 11 also of the approximate diameter of the passage through the valve housing are mounted on the central portion of the valve spool and extend a width sufficient to cover two fluid openings 12 and 13 formed in the valve housing when the valve is in the position shown in FIG. 2. The openings 12 and 13 extend through the housing to one side thereof to communicate with the power device 4 through fluid pressure lines 14 and 15 are best shown in FIG. 3. The lines 14 and 15 are coupled to the respective openings 12 and 13 in the valve housing and to the power device 4 in a conventional sealed manner.

The valve housing 7 includes a bottom portion which is slidably mounted in ways 16 to move in a direction left to right, or vice versa as viewing FIG. 2. The valve housing 7 and the ways 16 may be shaped or formed in any suitable manner to allow the valve housing to move longitudinally in the ways. The slidably mounted valve housing 7 is mounted adjacent a vertical plate member 17 supported on the bellcrank housing 2 by any conventional technique. The plate 17 includes a recess 18 for receiving a spring 19 which biases the valve housing to the right as viewing FIGS. 1 and 2.

A threaded projection 20 is attached in a threaded hole on a side of the valve housing opposite to the plate 17 and a cam follower 21 is secured on the end of projection thereof. The cam follower 21 is adapted to be urged against a cam 22 which is operatively connected to the bellcrank housing 2 in such a manner that movement of the valve element (not shown) in the control valve for control of fluid therethrough proportionally rotates the cam which has a desired configuration (to be described in detail later). It is within the scope of this invention to use cams which move in other modes in conjunction with the control position of the valve other than rotary as herein described. Therefore it should be apparent from the foregoing that the spring 19 maintains the cam follower 21 against the cam 22 during operation of the device and thus moves the valve housing 7 in response to a change in position of the cam.

The valve housing 7 further includes an opening 30 at the end thereof adjacent the vertical plate 17 to receive an actuator stem 31 wherein the end thereof contacts the valve spool 5 within the passage. The other end of the valve spool 5 is biased by suitable spring 32 located within the central passage in the valve housing to bear against the actuator stem. The actuator stem 31 extends through the vertical housing to a diaphragm actuator assembly 33 which effects movement of the valve spool within the valve housing. The diaphragm actuator assembly 33 includes a housing 34 which surrounds the actuator stem 31 and allows movement of the stem longitudinally within the housing. A disk member 35 is attached adjacent end 37 of the actuator stem to contact a suitable compression spring 38 also in contact with the vertical plate 17 wherein the spring biases the stem actuator in leftward direction as viewing FIG. 1 and 2. The actuator stem passes through a bearing 39 supported by a guide means 39' which also centrally locates spring 38 to allow movement of the actuator stem and control the position of the valve spool.

The end 37 of the actuator stem is attached to a piston 40 supported on a flexible diaphragm 41 having a desired response characteristic which is mounted between two contacting members 42 and 43 in a conventional manner. The member 43 on the opposite side from the stem forms a pressure chamber 44 having an inlet port 45 which is connected by suitable means (not shown) to a signal pressure. The signal pressure is representative of a parameter of a media being controlled by the control device and the parameter is sensed by a conventional transducer (not shown) which converts the parameter into a signal pressure which is transmitted to the input port of the pressure chamber as a liquid or gas. The conventional sensor is, for example, disclosed as a pressure-sensitive device, but it should be apparent that other transducer sensitive to other parameters of the media being controlled such as temperature, specific gravity and the like may be utilized in the invention as previously stated.

The valve housing further include two exhaust ports 50 and 51 which are respectively situated between the end flanges and inner flanges of the valve spool in the position illustrated for the spool in FIG. 2. The exhaust ports 50 and 51 communicates with respective exhaust passages 52 and 53 which extend through the valve housing to one side thereof and conduits 54 and 55 are attached to the two exhaust passages through a suitable coupling as best shown in FIG. 3. The exhaust conduits 54 and 55 in the present invention are connected to a suitably low-pressure level internally of the system which maybe in the case of control valve 2 at a downstream position of the valve since the downstream pressure is lower than the upstream pressure. Therefore, the present invention does not require an external exhaust to the atmosphere or the like which is beneficial for the prevention of pollution and leakage of gas to the atmosphere.

In the valve housing 7 a supply port 60 is also provided having a port which is in communication with a supply passage 61 extending to one side of the valve housing. As best shown in FIG. 3, the supply passage 61 is attached to a conduit 62 which directs a pressure signal thereto in response to a detected parameter or from a constant supply pressure source. In the embodiment herein illustrated, the supply pressure is connected to the upstream or high-pressure side of the control valve in a conventional manner through the use of a fluid medium in conduit 62 which may be either gas or liquid.

The power device 4 which operates the control valve according to the parameters sensed by the position controller communicates with the valve assembly by means of the two pressure lines 14 and 15. The power device 4 may be any suitable pneumatic or hydraulic power device such as a cylinder and piston as illustrated in FIG. 3 and 4. The power device 4 comprises a cylinder 70 with a piston 71 mounted therein having two faces 72 and 73 exposed to pressure on opposite side thereof to create two chambers. The piston is sealing contact with the inner cylinder surface by means of a conventional sealing means 74 mounted on a perimeter of the piston. In one chamber adjacent face 72 of the piston, pressure line 15 communicates the chamber with the position controller and the other pressure line 14 communicates with the other side of the piston in the second chamber.

In the position of the piston illustrated in FIG. 1, 2, and 3, equal pressure is directed by the pressure lines to the opposite side of piston 71 since the valve spool 5 is shown in reference to a null position. Any movement of the piston within the cylinder when the valve spool 5 is moved (to be explained in detail later) is transmitted through a conventional elongated transmission means 75 which extend through the end of the cylinder 70 and an elongated tubular housing 76 to the bottom of the control valve 77. The movement of the piston 71 is transmitted by transmission means 75 to cause a rotational movement of a shaft 78 coupled to the transmission means and extending from the control valve through bell housing 2.

Rotation of shaft 78 caused by movement of the piston regulates the operative position of a valve element within the control valve to change and regulate the flow of the media therethrough. Alternatively, other than described herein, the power device 4 may be any diaphragm or other form of a pressure-sensitive power transmitting to cause rotation of a valve element or other needed motion for changing the operative position of the device to be controlled.

As stated previously, the analog position controller is in a null position in FIG. 1 and 2 whereupon the upstream pressure being sensed by the sensor converts a parameter such as pressure of the media into a pressure signal which is directed into the valve housing through conduit 62 to exit at the supply port 60 in communication with passage 6. Further, the downstream pressure of valve 2, being a lower pressure, is directed into the chamber 44 adjacent the diaphragm 41 coupled to the actuator stem 31 and piston 40. In the situation when the two control ports 12 and 13 are covered by the inner flanges 10 and 11 of the valve spool 5, the pressure in communication with each side of the piston 71 of power device 4 through lines 15 and 16 are equal whereby no movement of the valve occurs since the piston is stationary. However, as utilization of the gas or other fluid media in the conduit or pipeline being controlled by the valve coupled to bell housing 2 is increased or decreased, the signal pressure directed to he inlet port 45 is varied. If, for example, the signal pressure increases to a level of force related to the product of the signal pressure and the effective area of the diaphragm 41 which is slightly greater than the preload force of the actuator spring 38, the diaphragm 41, the piston 40, and the actuator stem 31, together are moved to slide the valve spool 5 within the valve assembly.

The movement of the actuator stem 31 displaces the valve spool against the spring 32 to cause a longitudinal movement thereof. It should be apparent that as the valve spool is displaced the flanges 10 and 11 blocking the two control ports 12 and 13 are uncovered whereupon communication between the supply pressure from the pressure supply port 60 and one of the control ports occurs. Since the valve spool 5 of the invention is being described for movement in a right direction because of an increase of downstream pressure, it should be apparent that the communication between the supply port 60 and the control port 12 occurs while the flange 13 simultaneously blocks communication between the supply pressure and the other control port 11, but at the same time allows fluid communication between the exhaust port 50 and the control port 11.

As pressure is directed from the supply port 60 to the control port 12 through line 14 to one side of the piston 71 in the power device, the piston 71 is subjected to an increased force on the face adjacent the chamber receiving the source pressure. Therefore, the piston is caused to move due to the increased pressure to effect movement of the valve shaft 78 connected to the internal valve member to regulate and change the flow through the control valve in a predetermined manner. Simultaneously, as the operative position of the control valve 2 is changed by the power device, the cam 22 coupled to the valving element on the top of the bellcrank housing 2 is also rotated.

The configuration of the cam 22 is arranged such that the cam surface falls away from the cam follower 21 in response to above described response of valve spool. The valve housing 7 being urged against the cam 22 by the spring 19 thereupon slides in the ways 16 to follow the cam to contact therewith. Therefore, a movement of the valve housing relative to the spool also occurs in the analog position controller of the invention. The movement of the control valve and the cam 22 continues to occur until such times as the inner flanges 10 and 11 on the spool 5, through movement of the housing relative to the spool, again cover the control ports 12 and 13 to create a balance pressure in the power device 4. Therefore, the invention continuously varies the control of the valve until such time as a new null position indicating a predetermined desired ratio or level, from the upstream and downstream pressure is achieved. The system is continuous in that the spool may be moved in the opposite direction if a decreased signal pressure is transmitted to actuator chamber to cause movement of the actuator stem in a left direction as shown in FIG. 2. It should be apparent that in such a situation, a leftward movement of actuator stem effect a similar movement of valve spool to cause fluid communication between the supply port and the opposite control port than previously described. Therefore, the action of the piston, control valve and feedback to the valve housing is opposite than occurred in the previous description.

The control process of the analog position controller of the invention is therefore continuous, repetitive, and reversible. The continued increase in the signal pressure causes the above phenomenon to continue, a repeated increase in signal pressure causes the above phenomenon to repeat, and decreasing signal pressure cause the above process to reverse. It should be noted that the cam follower 21 is attached to the shaft by means of threads 20 so that the cam follower 21 may be adjusted in reference to the cam 22. Adjusting the cam follower 21 towards or away from the controller valve assembly presets the controller valve assembly for a greater or less distance to thus vary the initial diaphragm pressure required from the signal port 45 necessary to displace the valve spool 5 from a null position.

In the above description, there has been disclosed an improved analog position controller and, for purposes of illustration, the controller was described with reference to a valve control device. However, it should be apparent that the analog position controller of the invention may be utilized with other control devices to control any media in response to variable parameter of such media. Further, as stated previously, the pressure signal being directed in the system need not be of the same media as the media being controlled. It is also within the scope of the invention to utilize a source pressure which comes from a standard source other than as a pressure representative of the level of a parameter of the media being controlled as described in reference to the embodiment of the invention. Moreover, the fluid media being respectively communicated to the input port 45, the source media into port 61, and the media being controlled by the control device, all may be the same or different fluids according to desired results.

While the invention has been described with reference to the preferred embodiment, it will be understood by those skilled in the art that various changes may be made and equivalents may be substituted for elements thereof without departing from the true spirit of the scope of the invention. In addition, modifications may be made to adapt a particular situation or material to the teaching of the invention without departing from the essential teachings.

What is claimed is:

1. An apparatus for controlling the operative position of a control means according to a sensed parameter comprising
   controller means for transmitting a control pressure signal in response to a change from a predetermined level of an input pressure signal representative of a parameter to be controlled.
   a variable position control means for regulating the level of said parameter,
   transmission means coupling said controller means and said control means for receiving said control signal and adapted to vary the operative position of said control means proportional to the control pressure transmitted thereto, and
   feedback means operatively connected to said control means and said controller means to cause said controller means to discontinue said control signal upon said control means reaching an operative position returning said input pressure signal to said predetermined level.

2. The apparatus of claim 1 wherein said control means controls a parameter of a fluid within a conduit and said input signal is proportional to a parameter of said fluid.

3. The apparatus of claim 2 wherein control means is a valve means regulating the flow in said conduit.

4. The apparatus of claim 3 wherein said input signal is proportional to the downstream pressure from said valve means.

5. The apparatus of claim 4 wherein said control signal is representative of the upstream pressure from said valve means whereby said predetermined level is a selected ratio of said downstream and said upstream pressure.

6. An analog position controller for regulating the position of a variable position control device according to a sensed parameter of a media comprising a valve housing movably supported on a support member, said valve housing including a central passage, a valve member mounted for movement in said central passage, an actuation means operatively connected to the valve member and adapted to move said valve member upon an input pressure signal representative of a selected parameter varying from a predetermined level, a first and second control port in said valve housing in fluid communication with said central passage, a power device coupled to a variable position control device controlling the selected parameter and adapted to vary the operative position thereof, said first and second control ports in fluid communication with said power device to vary respectively the operative position of the control device in opposite directions, said valve member including a fluid blocking means to block fluid communication between the first and second control ports and the fluid passage upon the input signal being said predetermined level, and further to allow said control ports to communicate with said fluid passage upon movement of said valve member caused by the input pressure signal varying from said predetermined level, said valve housing further including a supply port in fluid communication with said passage and a source of supply pressure whereby said source of supply pressure is directed by said blocking means to a selected one of said control ports upon movement of said valve member to cause a desired change of operative position of said control device, and means coupled to the valve housing to selectively move said housing relative to the valve member to cause said blocking means to block the first and second control ports after said movement of the valve member.

7. The apparatus of claim 6 wherein the other of said control ports is in fluid communication with an exhaust means positioned in said valve housing as the selected one of said control ports is in communication with said supply port.

8. An analog position controller for controlling the operative position of a control device comprising a valve-housing means having a passage and a supply port in fluid communication therewith adapted to receive a pressure signal from a pressure source, said valve-housing means further including a control port means for directing a pressure signal for changing the operative position of a control device in a selected manner, a valve element movably supported in said passage and adapted to be moved relative to said valve housing from a null position upon an input pressure representative of a media varying from a predetermined value, said valve element having a configuration for preventing pressure communication of said source pressure and the control port means in said first position and allowing communication therebetween upon said valve element being moved to direct a pressure signal to a control device, and means coupled to the valve housing to selectively move said housing relative to said valve element upon said valve element being moved to return said valve element to a null position with respect to said valve housing for preventing the directing of pressure signal from said outlet port.

9. The controller of claim 8 wherein said means to move said valve housing comprises feedback means to move said housing relative to said valve element in predetermined proportion to the change of operative position of the control device.

10. An analog position controller for regulating the position of a variable position control device according to a sensed parameter of a media comprising a valve housing movably supported on a support member, said valve housing including a central passage, a valve member mounted for movement in said central passage, an actuation means operatively connected to the valve member and adapted to move said valve member upon an input pressure signal representative of a selected parameter varying from a predetermined level, a first and second control port in said valve housing in fluid communication with said central passage, a power device coupled to a variable position control device controlling the selected parameter and adapted to vary the operative position thereof, said first and second control ports in fluid communication with said power device to vary respectively the operative position of the control device in opposite directions, said valve member including a fluid-blocking means to block fluid communication between the first and second control ports and the fluid passage upon the input signal being said predetermined level, and further to allow said control ports to communicate with said fluid passage upon movement of said valve member caused by the input pressure signal varying from said predetermined level, said valve housing further including a supply port in fluid communication with said passage and a source of supply pressure whereby said source of supply pressure is directed by said blocking means to a selected one of said control ports upon movement of said valve member to cause a desired change of operative position of said control device, and feedback means coupled to the control device and the valve housing to move said housing relative to the valve member proportional to the change of operative position of said control device to cause said blocking means to block the first and second control ports and discontinue the varying of the operative position of the control device.

11. The apparatus of claim 10, wherein said control device is a valve for controlling the flow of fluid in a pipeline.

12. The apparatus of claim 11, wherein said input pressure is representative of the pressure downstream of said valve and the supply source is representative of pressure upstream of said valve.

* * * * *